(12) United States Patent
Fulton et al.

(10) Patent No.: US 9,303,580 B2
(45) Date of Patent: Apr. 5, 2016

(54) DETECTION OF DIESEL FUEL GELLING

(71) Applicant: Ford Global Technologies, LLC, Dearborn, MI (US)

(72) Inventors: Brien Lloyd Fulton, West Bloomfield, MI (US); David Robert Nader, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 734 days.

(21) Appl. No.: 13/662,096

(22) Filed: Oct. 26, 2012

(65) Prior Publication Data

US 2014/0121936 A1    May 1, 2014

(51) Int. Cl.
| | |
|---|---|
| G06F 19/00 | (2011.01) |
| G06G 7/70 | (2006.01) |
| F02D 41/22 | (2006.01) |
| F02D 41/06 | (2006.01) |
| F02M 37/00 | (2006.01) |
| F02M 25/07 | (2006.01) |

(52) U.S. Cl.
CPC .............. F02D 41/22 (2013.01); F02D 41/064 (2013.01); F02M 37/0064 (2013.01); F02D 2041/228 (2013.01); F02D 2200/021 (2013.01); F02D 2200/0602 (2013.01); F02D 2200/0612 (2013.01); F02M 25/0707 (2013.01); F02M 25/0726 (2013.01); Y02T 10/40 (2013.01)

(58) Field of Classification Search
CPC ..... F02D 19/029; F02D 41/064; F02D 41/22; F02M 37/0064
USPC .......... 701/101, 102, 103; 123/179.3, 179.14, 123/179.15, 179.16, 1 A, 575; 73/35.02, 73/54.01
See application file for complete search history.

(56) References Cited

U.S. PATENT DOCUMENTS

| | | | | |
|---|---|---|---|---|
| 4,252,097 | A * | 2/1981 | Hartford et al. | 123/381 |
| 6,216,528 | B1 * | 4/2001 | Carrell et al. | 73/54.01 |
| 6,314,944 | B1 * | 11/2001 | Majima | 123/491 |
| 6,360,717 | B1 * | 3/2002 | Chang et al. | 123/381 |
| 6,684,153 | B2 * | 1/2004 | Wada | 701/114 |
| 6,695,470 | B1 * | 2/2004 | Berndorfer et al. | 374/45 |
| 6,975,936 | B2 * | 12/2005 | Akuzawa et al. | 701/114 |
| 7,107,828 | B2 * | 9/2006 | Falkowski et al. | 73/114.57 |
| 7,478,627 | B2 * | 1/2009 | Miyata et al. | 123/491 |
| 7,788,017 | B2 | 8/2010 | Nagata et al. | |
| 8,543,313 | B2 * | 9/2013 | Borchsenius et al. | 701/103 |
| 2004/0069273 | A1 * | 4/2004 | Visser et al. | 123/406.47 |
| 2009/0138173 | A1 * | 5/2009 | Liu | 701/103 |
| 2009/0319152 | A1 * | 12/2009 | Skala et al. | 701/101 |
| 2010/0100303 | A1 | 4/2010 | Yuzaki et al. | |
| 2010/0242926 | A1 * | 9/2010 | Biddulph | 123/549 |
| 2011/0130979 | A1 * | 6/2011 | Kumagai et al. | 702/50 |

FOREIGN PATENT DOCUMENTS

| | | |
|---|---|---|
| EP | 0896144 A2 | 2/1999 |
| EP | 2090766 A2 | 8/2009 |

* cited by examiner

*Primary Examiner* — Lindsay Low
*Assistant Examiner* — David Hamaoui
(74) *Attorney, Agent, or Firm* — Julia Voutyras; Alleman Hall McCoy Russell & Tuttle LLP

(57) ABSTRACT

A method for diagnosing a performance issue in a vehicle system having a diesel engine, a fuel system, and an on-board diagnostic system. The method includes cranking the engine, and, if a pressure sensed in the fuel system during or after the engine cranking differs by a threshold amount from the pressure sensed during a previous operation of the engine, indicating excessive fuel viscosity in the on-board diagnostic system.

13 Claims, 5 Drawing Sheets

DETECTION OF DIESEL FUEL GELLING

TECHNICAL FIELD

This application relates to the field of motor-vehicle engineering, and more particularly, to detection of fuel gelling in a diesel-engine system.

BACKGROUND AND SUMMARY

The viscosity of diesel fuel increases with decreasing temperature. This is a cause of various cold-weather issues for diesel-engine systems in motor vehicles. In pumping cold, viscous fuel through a fuel system, an increased pressure drop occurs in various segments of the fuel system—especially across filters and through orifices. The increased pressure drop may prevent the fuel from being delivered to the engine at the required rate, causing start difficulties, stalls, rough idle and other performance issues. When the temperature drops to 5° C. below the 'cold filter plug point' (CFPP), some constituents of diesel fuel turn into a non-flowing gel, which may clog the fuel lines, filters, and orifices, and thereby prevent the engine from operating properly.

In many scenarios, accurate on-board diagnosis of excessive fuel viscosity, including gelation, may be valuable to a motor-vehicle operator, as various remedies are available to restore or protect engine performance in that event. Such remedies include moving the vehicle into a warm garage, purchasing fuel from a different source, or adding alternative fuel blends or other additives to the fuel system. However, excessive fuel viscosity may be difficult for the operator to diagnose, because its symptoms may be similar to those of a clogged fuel filter or a defective fuel pump or fuel injector, and may disappear as fuel temperature increases.

Moreover, the temperature alone is not a reliable indicator of diesel-fuel viscosity, which is affected by other factors including the moisture content of the fuel. More significantly, the blend of diesel fuel obtained from a service station may vary from region to region, and with the season. Lower-viscosity blends are distributed in cold climates during the winter months, for example, to partly address the issues noted above. Because of the variability of the fuel in a fuel tank at any given time, it is difficult to compute the viscosity of the fuel as a function of temperature, and thereby determine whether increased fuel viscosity could be the cause of a performance issue.

To address these issues and provide still other advantages, one embodiment of this disclosure provides a method for diagnosing a performance issue in a vehicle system having a diesel engine, a fuel system, and an on-board diagnostic system. The method includes cranking the engine, and, if a pressure sensed in the fuel system during or after the cranking differs from the pressure sensed during a previous operation of the engine, indicating excessive fuel viscosity in the on-board diagnostic system. In this manner, excessive fuel viscosity can be better distinguished from other fuel-system issues.

The summary above is provided to introduce a selected part of this disclosure in simplified form, not to identify key or essential features. The claimed subject matter, defined by the claims, is limited neither to the content of this summary nor to implementations that address the problems or disadvantages noted herein.

DETAILED DESCRIPTION

Figure 1:
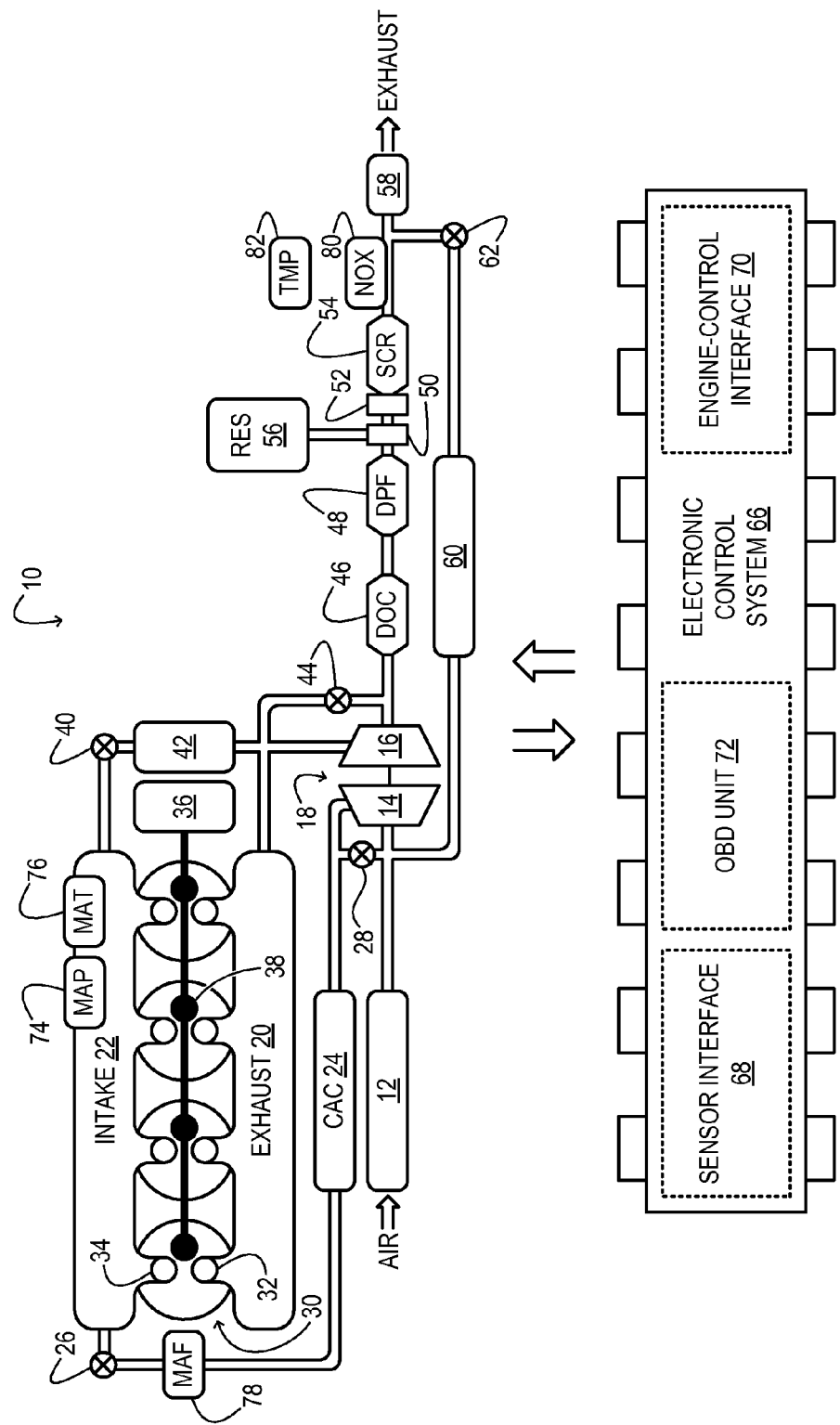
FIG. 1 schematically shows aspects of an example motor-vehicle system in accordance with an embodiment of this disclosure.

FIG. 1 schematically shows aspects of an example engine system 10 of a motor vehicle. In engine system 10, fresh air is inducted into air cleaner 12 and flows to compressor 14. The compressor may be any suitable intake-air compressor—a motor-driven or driveshaft driven supercharger compressor, for example. In engine system 10, however, the compressor is mechanically coupled to turbine 16 in turbocharger 18, the turbine driven by expanding engine exhaust from exhaust manifold 20. In one embodiment, the compressor and turbine may be coupled within a twin scroll turbocharger. In another embodiment, the turbocharger may be a variable geometry turbocharger (VGT), in which turbine geometry is actively varied as a function of engine speed.

Compressor 14 is coupled fluidically to intake manifold 22 via charge-air cooler (CAC) 24 and throttle valve 26. Pressurized air from the compressor flows through the CAC and the throttle valve en route to the intake manifold. In the illustrated embodiment, compressor by-pass valve 28 is coupled between the inlet and the outlet of the compressor. The compressor by-pass valve may be a normally closed valve configured to open to relieve excess boost pressure under selected operating conditions.

Exhaust manifold 20 and intake manifold 22 are coupled to a series of cylinders 30 through a series of exhaust valves 32 and intake valves 34, respectively. In one embodiment, the exhaust and/or intake valves may be electronically actuated. In another embodiment, the exhaust and/or intake valves may be cam actuated. Whether electronically actuated or cam actuated, the timing of exhaust and intake valve opening and closure may be adjusted as needed for desired combustion and emissions-control performance.

Cylinders 30 may be supplied any of a variety of fuels, depending on the embodiment: diesel, biodiesel, or mixtures thereof. In the illustrated embodiment, fuel from fuel system 36 is supplied to the cylinders via direct injection through fuel injectors 38. In the various embodiments considered herein, the fuel may be supplied via direct injection, port injection, or any combination thereof. In engine system 10, combustion may be initiated via compression ignition in any variant.

Engine system 10 includes high-pressure (HP) exhaust-gas recirculation (EGR) valve 40 and HP EGR cooler 42. When the HP EGR valve is opened, some high-pressure exhaust from exhaust manifold 20 is drawn through the HP EGR cooler to intake manifold 22. In the intake manifold, the high pressure exhaust dilutes the intake-air charge for cooler combustion temperatures, decreased emissions, and other benefits. The remaining exhaust flows to turbine 16 to drive the turbine. When reduced turbine torque is desired, some or all of the exhaust may be directed instead through wastegate 44, by-passing the turbine. The combined flow from the turbine and the wastegate then flows through the various exhaust-aftertreatment devices of the engine system, as further described below.

In engine system 10, diesel-oxidation catalyst (DOC) 46 is coupled downstream of turbine 16. The DOC includes an internal catalyst-support structure to which a DOC washcoat is applied. The DOC is configured to oxidize residual CO, hydrogen, and hydrocarbons present in the engine exhaust. Diesel particulate filter (DPF) 48 is coupled downstream of DOC 46. The DPF is a regenerable soot filter configured to trap soot entrained in the engine exhaust flow; it comprises a soot-filtering substrate. Applied to the substrate is a washcoat that promotes oxidation of the accumulated soot and recovery of filter capacity under certain conditions. In one embodiment, the accumulated soot may be subject to intermittent oxidizing conditions in which engine function is adjusted to temporarily provide higher-temperature exhaust. In another embodiment, the accumulated soot may be oxidized continuously or quasi-continuously during normal operating conditions.

Reductant injector 50, reductant mixer 52, and SCR stage 54 are coupled downstream of DPF 48 in engine system 10. The reductant injector is configured to receive a reductant (e.g., a urea solution) from reductant reservoir 56 and to controllably inject the reductant into the exhaust flow. The reductant injector may include a nozzle that disperses the reductant solution in the form of an aerosol. Arranged downstream of the reductant injector, the reductant mixer is configured to increase the extent and/or homogeneity of the dispersion of the injected reductant in the exhaust flow. The reductant mixer may include one or more vanes configured to swirl the exhaust flow and entrained reductant to improve the dispersion. Upon being dispersed in the hot engine exhaust, at least some of the injected reductant may decompose. In embodiments where the reductant is a urea solution, the reductant will decompose into water, ammonia, and carbon dioxide. The remaining urea decomposes on impact with the SCR stage (vide infra).

SCR stage 54 is coupled downstream of reductant mixer 52. The SCR stage may be configured to facilitate one or more chemical reactions between ammonia formed by the decomposition of the injected reductant and $NO_x$ from the engine exhaust, thereby reducing the amount of $NO_x$ released into the ambient. The SCR stage comprises an internal catalyst-support structure to which an SCR washcoat is applied. The SCR washcoat is configured to sorb the $NO_x$ and the ammonia, and to catalyze the redox reaction of the same to form dinitrogen ($N_2$) and water.

It will be noted that the nature, number, and arrangement of exhaust-aftertreatment stages in the engine system may differ for the different embodiments of this disclosure. For instance, some configurations may include an additional soot filter or a multi-purpose exhaust-aftertreatment stage that combines soot filtering with other emissions-control functions, such as $NO_x$ trapping.

Continuing in FIG. 1, all or part of the treated exhaust may be released into the ambient via silencer 58. Depending on operating conditions, however, some treated exhaust may be diverted through low-pressure (LP) EGR cooler 60. The exhaust may be diverted by opening LP EGR valve 62 coupled in series with the LP EGR cooler. From LP EGR cooler 60, the cooled exhaust gas flows to compressor 14. By partially closing exhaust-backpressure valve 64, the flow potential for LP EGR may be increased during selected operating conditions. Other configurations may include a throttle valve upstream of air cleaner 12 instead of the exhaust backpressure valve.

Engine system 10 includes an electronic control system (ECS) 66 configured to control various engine-system functions. The ECS includes memory and one or more processors configured for appropriate decision making responsive to sensor input and directed to intelligent control of engine-system componentry. Such decision-making may be enacted according to various strategies such as event-driven, interrupt-driven, multi-tasking, multi-threading, and the like. In this manner, the ECS may be configured to enact any or all aspects of the methods disclosed hereinafter. Accordingly, the method steps disclosed hereinafter—e.g., operations, functions, and/or acts—may be embodied as code programmed into machine-readable storage media in the ECS.

ECS 66 includes sensor interface 68, engine-control interface 70, and on-board diagnostic (OBD) unit 72. To assess operating conditions of engine system 10 and of the vehicle in which the engine system is installed, sensor interface 68 receives input from various sensors arranged in the vehicle—flow sensors, temperature sensors, pedal-position sensors, fuel-pressure sensors, etc. Some example sensors are shown in FIG. 1—manifold air-pressure (MAP) sensor 74, manifold air-temperature sensor (MAT) 76, mass air-flow (MAF) sensor 78, $NO_x$ sensor 80, and exhaust-system temperature sensor 82. Various other sensors may be provided as well.

Engine-control interface 70 is configured to actuate electronically controllable valves, actuators, and other componentry of the vehicle—compressor by-pass valve 28, wastegate 44, and EGR valves 40 and 62, for example. The engine-control interface is operatively coupled to each electronically controlled valve and actuator and is configured to command its opening, closure, and/or adjustment as needed to enact the control functions described herein. OBD unit 72 is a portion of the ECS configured to diagnose degradation of various components of engine system 10. Such components may include oxygen sensors, fuel injectors, and emissions-control components, as examples.

Figure 2:
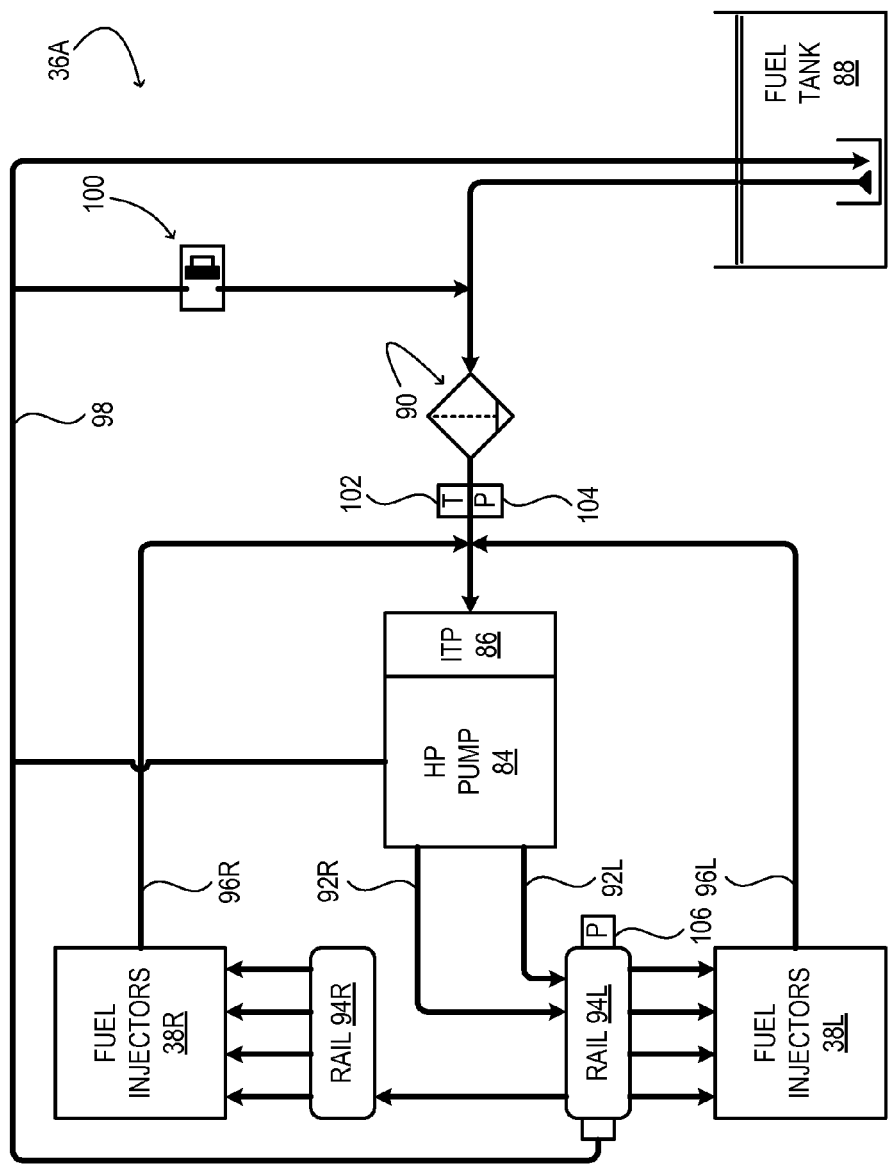
FIGS. 2 and 3 show aspects of example fuel systems in accordance with embodiments of this disclosure.

FIG. 2 shows aspects of an example fuel system 36A, which is a depression-type fuel system. Fuel system 36A includes a high-pressure (HP) fuel-injection pump 84 with an internal transfer pump (ITP) 86 coupled to its inlet. The ITP draws diesel fuel from fuel tank 88 into the HP pump, suctioning the fuel through fuel filter 90. In some embodiments, the ITP may include an inlet throttle. Continuing in FIG. 2, the HP pump includes a left-side outlet 92L and a right-side outlet 92R. In this configuration, pressurized fuel from both the left- and right-side outlets flows to left-side fuel rail 94L, which supplies fuel to left-side fuel injectors 38L. From the left side fuel rail, the pressurized fuel also flows to right-side fuel rail 94R, which supplies fuel to right-side fuel injectors 38R. Thus, the fuel system is fluidically coupled to the engine via the left and right fuel rails. Return lines 96L and 96R conduct non-injected fuel from the fuel injectors back to the inlet of the secondary filter on the engine or the ITP. A return line 98L is also provided from the left-side fuel rail. This line conducts non-injected fuel from the fuel rails, which is bled off by the PCV to control rail pressure, along with additional effluent cooling and lubricating fuel from the HP pump, back to fuel tank 88. Bypass valve 100 diverts this fuel to the inlet of the fuel filter under selected conditions—e.g., at low temperatures where performance is improved by retaining as much heat as possible in the recirculating fuel.

Fuel system 36A includes a plurality of sensors: temperature sensor 102, and fuel-pressure sensors 104 and 106. Fuel-pressure sensor 104 is arranged upstream of HP pump 84, and fuel-pressure sensor 106 is arranged downstream of the HP pump. In one embodiment, each of the fuel-pressure sensors generates an output signal that varies continuously with the fuel pressure in the conduit to which it is coupled. In other embodiments, at least one of the fuel-pressure sensors may be a pressure switch having, effectively, a Boolean output that switches its state when the fuel pressure traverses a predefined threshold. In the embodiment illustrated in FIG. 2, fuel-pressure sensor 106 is directly coupled to fuel rail 94L.

In other embodiments, at least one fuel-pressure sensor may be fluidically coupled to a fuel filter.

Figure 3:
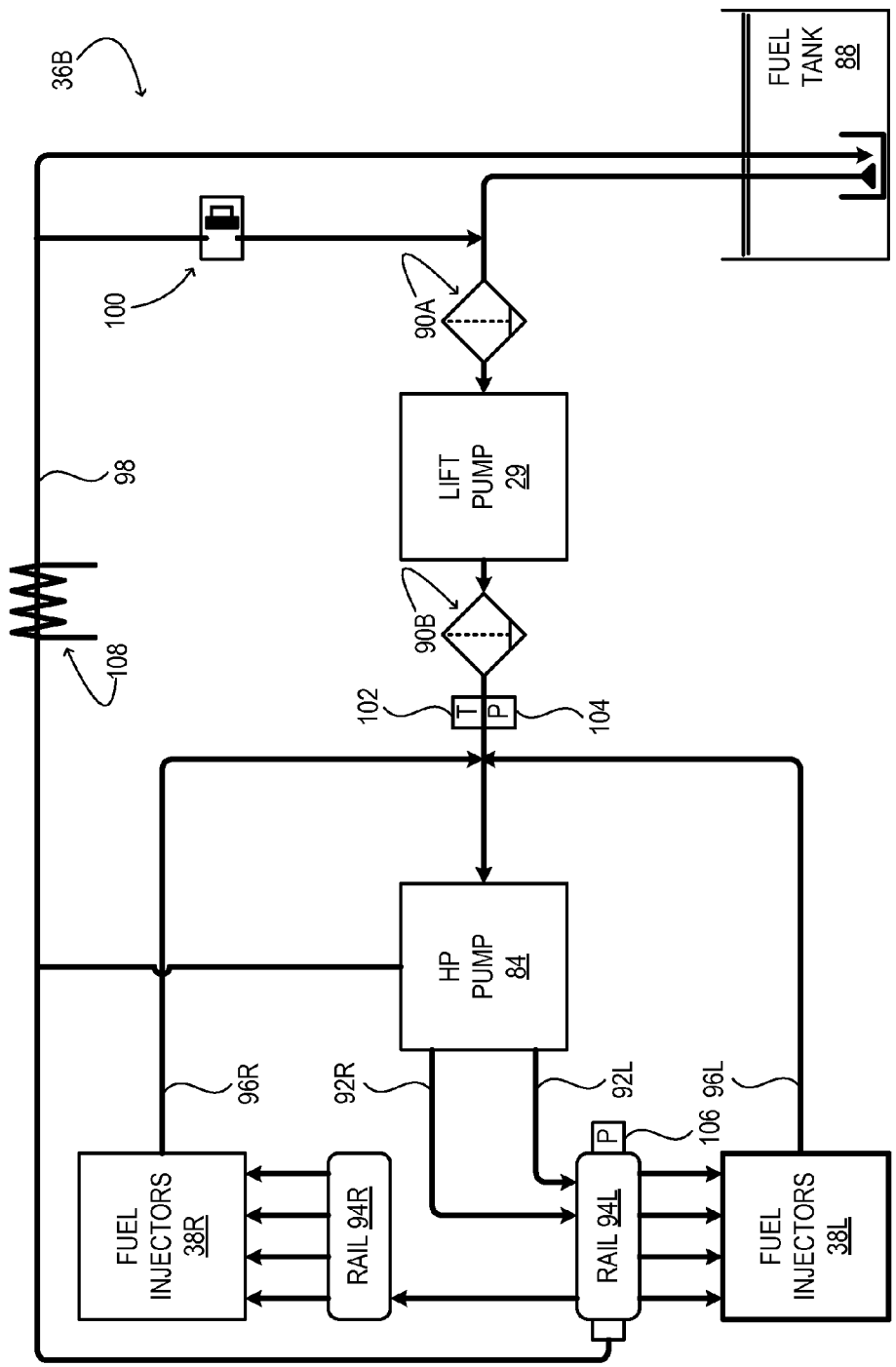

FIG. 3 shows aspects of another example fuel system 36B in one embodiment. Fuel system 36B includes a lift pump instead of an ITP. Fuel filters 90A and B are arranged at the inlet and outlet sides of the lift pump. This fuel system also includes a fuel cooler 108 to provide cooling of the fuel in return line 98, under selected conditions.

No aspect of the foregoing description or drawings should be interpreted in a limiting sense, for numerous variants and combinations are contemplated as well. For example, another equally suitable fuel system may include both an ITP and a lift pump. In addition, any of the fuel filters 90 may include additional componentry, such as a water-in-fuel sensor, a water reservoir to temporarily store water removed from the fuel by the fuel filter, and a drain to permanently discharge the stored water.

The configurations described above enable various methods for diagnosing a performance issue in a vehicle system. Accordingly, some such methods are now described, by way of example, with continued reference to the above configurations. It will be understood, however, that the methods here described, and others within the scope of this disclosure, may be enabled by different configurations as well. The methods may be entered upon any time vehicle system 10 is operating, and may be executed repeatedly. Naturally, each execution of a method may change the entry conditions for a subsequent execution and thereby invoke a complex decision-making logic. Such logic is fully contemplated in this disclosure.

Figure 4:
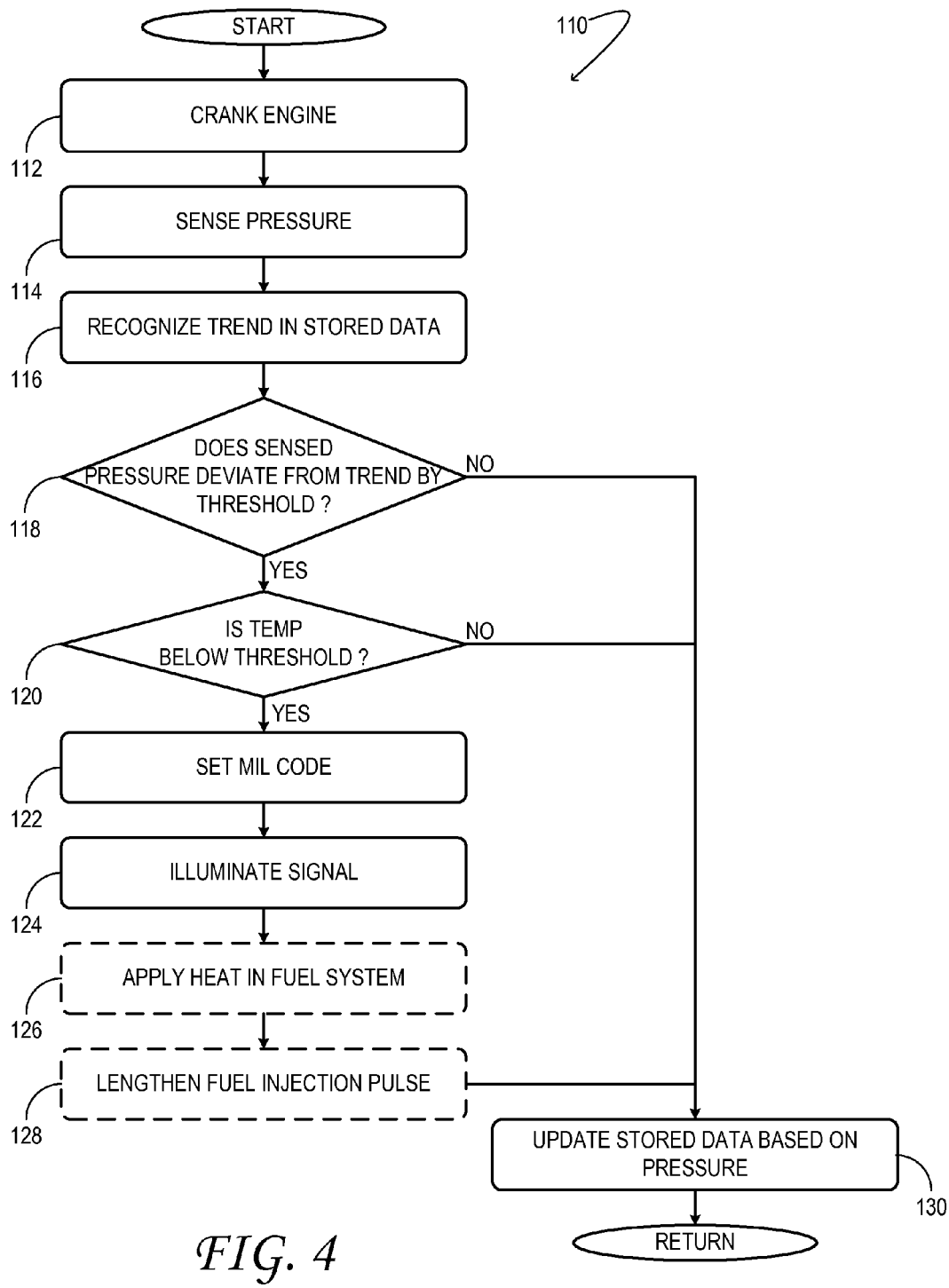
FIG. 4 illustrates an example method for diagnosing a performance issue in a motor-vehicle system in accordance with an embodiment of this disclosure.

FIG. 4 illustrates an example method 110 for diagnosing a performance issue in a vehicle system having a diesel engine, a fuel system, and an on-board diagnostic system. At 112 of method 110, the engine is cranked to commence operation, as part of the normal start-up procedure. At 114 at least one fuel-system pressure is sensed during the cranking of the engine. In the various embodiments considered herein, the pressure may be sensed upstream and/or downstream of the HP fuel-injection pump. Alternatively, the pressure may be sensed across a fuel filter in the fuel system. In general, the pressure may be sensed based on an output of one or more fuel-pressure sensors disposed in the fuel system. Although the present method illustrates pressure sensing while the engine is still being cranked, such sensing may occur shortly after cranking in other embodiments.

In method 110, a record of fuel pressures sensed during previous engine-cranking and/or operating events is stored in a memory component of the OBD system of the motor vehicle. The data may take any suitable form—a pressure reading for every engine-cranking event, or every third such event, or every fifth such event, and so on. In one embodiment, pressure data for every engine-cranking event may be retained for the last several events, but prior to that the data may be sparser.

Figure 5:
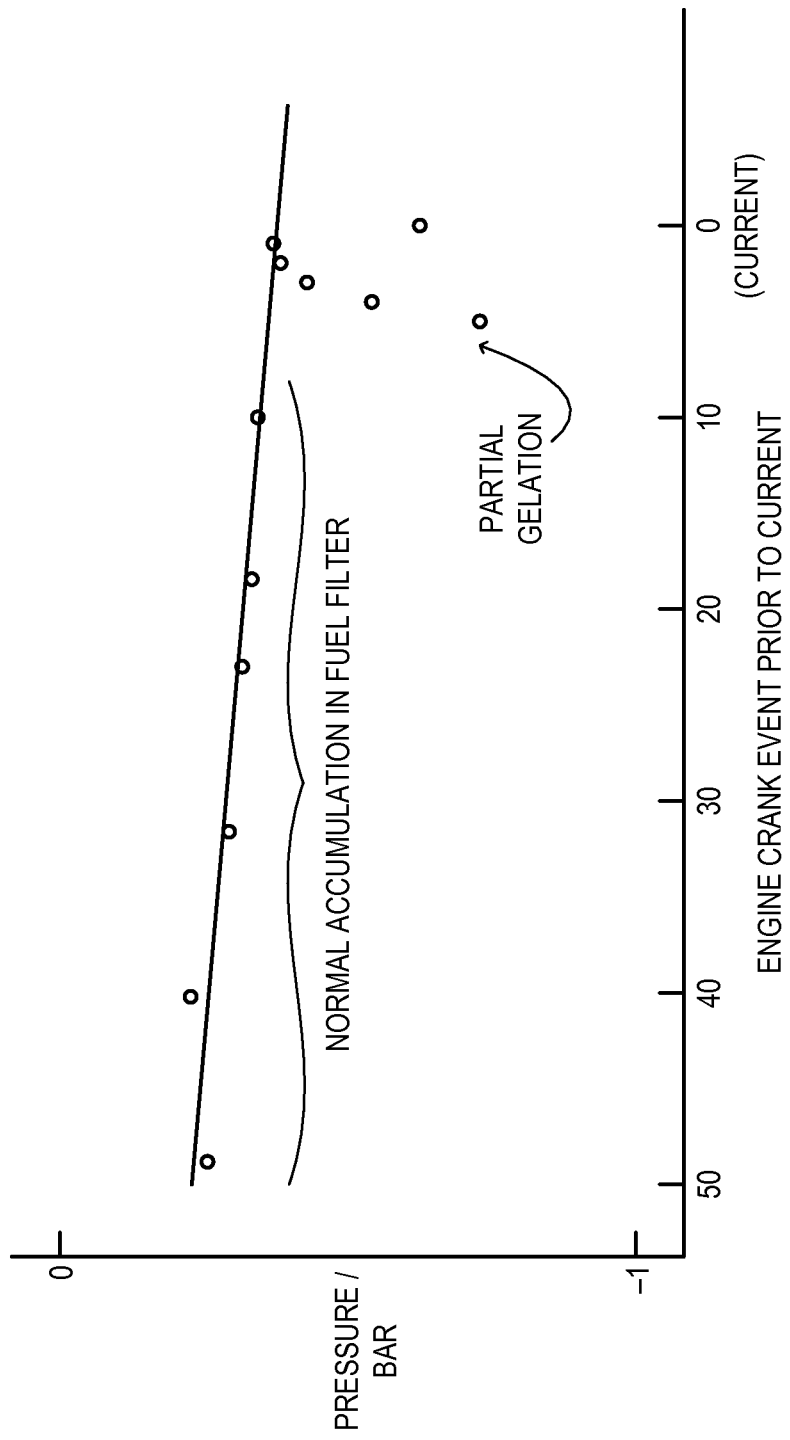
FIG. 5 represents a record of sensed fuel pressure during a sequence of engine-cranking events in accordance with an embodiment of this disclosure.

One example representation of sensed pressure data is shown in FIG. 5. The pressure may be sensed upstream of an HP pump—e.g., by pressure sensor 104 of the previous drawings—over a suitable time interval during engine cranking. For instance, the pressure may be sensed from the fifth to the twentieth rotation of the engine. The graph reveals a small gradual drop in the sensed pressure over a relatively long period of time—fifty engine cranking events in the illustrated example. This trend in the data, which fits the indicated trend line, may be due to the expected accumulation of fuel-borne impurities in a fuel filter of the fuel system. The graph also shows evidence of a more precipitous pressure drop sensed five engine-cranking events prior to the current engine cranking event. This pressure drop, which deviates from the long-term trend line, could be indicative of partial gelation—i.e., excessive viscosity—of the fuel.

Returning now to FIG. 4, at 116 of method 110, a trend in stored data is recognized. This action may include defining a trend line through the data to reflect the long-term evolution of the sensed pressure. In one embodiment, the trend may be consistent with the normal accumulation of fuel-borne impurities in a fuel filter of the fuel system. In some embodiments, numerical parameters that specify the trend may be computed and/or stored in the OBD system. Such parameters may include a slope and intercept, or coefficients of a polynomial fit to the data, etc. The slope and intercept or other parameters may be based on a least squares fit of the data over a selected number of stored data points—ten points, for example. In some embodiments, the data points chosen for fitting may be a subset of the most recent stored data—filtered, in some cases, according to suitable criteria. In one example, only data from cold-starts (engine at ambient temperature) may be used.

At 118 it is determined whether the pressure sensed in the fuel system during engine cranking and/or operating deviates from the recognized trend by a threshold amount. In most cases, excessive fuel viscosity will cause the sensed pressure to be lower than its set-point value, both in high- and low-pressure regions of the fuel system. Appropriate values for the threshold amount may differ in the various embodiments of this disclosure, but may include, depending upon fuel system design 10% of the set-point pressure: 1.0 bar upstream of the HP pump, or 400 bar downstream of the HP pump, as examples. If the sensed pressure does deviate from trend by the threshold amount, then the method advances to 120. Otherwise, the method returns.

In the various embodiments here contemplated, a deviation from the trend may be detected in various ways. For example, a change in the slope of the data of sufficient magnitude may signal a deviation from the trend. If the change in slope is sufficiently great (e.g., above a threshold), and further if the change is in a direction of decreasing slope (i.e., the pressure is dropping faster than previously), then excessive fuel viscosity may be distinguished from fuel filter degradation.

Continuing in FIG. 4, at 120 it is determined whether a temperature sensed by a sensor in the fuel system or elsewhere in the motor vehicle is below a threshold temperature. Suitable values for the threshold temperature may include −2° F., −5° F., or −10° F., for example. The threshold temperature may correspond to an upper bound of a range of temperatures in which it is possible that the deviant pressure drop detected at 118 could be due to excessive fuel viscosity. If the temperature is not below the threshold, then the method returns. Otherwise, the method advances to 122. At 122 the customer will be alerted; for instance, a so-called check engine code indicative of excessive fuel viscosity is set in the on-board diagnostic system of the vehicle. In this manner, the condition of excessive fuel viscosity is indicated in the on-board diagnostic system. In one embodiment, the chosen code may distinguish the excessive fuel viscosity condition from various other fuel-system issues, such as fuel-filter clogging from fuel-borne impurities, or fuel-injector malfunction.

The current method also contemplates the utility of informing the operator of the motor vehicle of the excessive fuel viscosity condition. At 124, therefore, a signal on a dashboard or elsewhere in the cabin of the vehicle may be illuminated to indicate the excessive fuel viscosity. In some embodiments, an audible alarm may be used in lieu of or in addition to the signal.

In some embodiments, further action may be taken to proactively remedy the condition of excessive fuel viscosity. At 126 of method 110, for instance, active heating is applied to one or more fuel-system components in order to reduce the viscosity of the fuel. Such components may include fuel injectors, a fuel line, an orifice, or a fuel filter, for instance. One or more of these components may be heated electrically, for example. In addition, or as an alternative, the ECS of the vehicle may attempt to compensate for increased fuel viscosity by adjusting one or more control settings of the engine system. At 128, for example, the ECS of the vehicle automatically lengthens the fuel-injection pulse width in the current fuel-injection program, attempting to compensate for lower injection rates due to excessive fuel viscosity. Naturally, this approach is better suited to conditions in which the fuel is only somewhat elevated in viscosity, rather than substantially gelled. Continuing in FIG. 4, at 130 the data record of the sensed fuel-system pressures is updated based on the pressure sensed at 114.

Method 110 provides a specific example in which excessive fuel viscosity is indicated in an OBD system if a pressure sensed in the fuel system during engine cranking differs by a threshold amount from a pressure sensed during previous cranking of the engine. Here, the excessive fuel viscosity is indicated only if a temperature sensed in the vehicle system is below a threshold temperature. In this example method, a record of pressures sensed during previous engine-cranking events is stored and used to determine whether the currently sensed pressure deviates from an observed trend. Despite the utility of this approach, numerous other variants are contemplated as well. In one alternative embodiment, the pressure sensed during previous cranking of the engine (to which the currently sensed pressure is compared) may be an average pressure taken over a plurality of previous engine-cranking events. In another embodiment, it may be the pressure sensed during the engine-cranking event immediately prior to the current one. In still other embodiments, pressure may be recorded at a given drive cycle of the engine—e.g., the fifth rotation, twentieth rotation, etc. If the pressure is substantially lower during cold crank or cold operation, versus warm crank or warm operation on the same drive cycle, then excessive fuel viscosity may be indicated.

Aspects of this disclosure are set forth by example, with reference to the illustrated embodiments described above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

In the methods illustrated and/or described herein, some of the indicated process steps may be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A method for diagnosing a performance issue in a vehicle system having a diesel engine, a fuel system, and an on-board diagnostic system, comprising:
   cranking the engine; and
   if a pressure sensed in the fuel system during or after the cranking of the engine is determined to differ by a threshold amount from a pressure sensed during a previous cranking of the engine, indicating excessive fuel viscosity in the on-board diagnostic system only if a temperature sensed in the vehicle system is below a threshold temperature, wherein indicating the excessive fuel viscosity includes setting a check-engine code indicative of the excessive fuel viscosity in the on-board diagnostic system, the check-engine code distinguishing the excessive fuel viscosity from other fuel-system issues including fuel-filter clogging or fuel-injector malfunction.

2. The method of claim 1 wherein the pressure sensed in the fuel system is sensed upstream of a fuel-injection pump.

3. The method of claim 1 wherein the pressure sensed in the fuel system is sensed downstream of a fuel-injection pump.

4. The method of claim 1 wherein the pressure sensed in the fuel system is sensed across a fuel filter.

5. The method of claim 1 wherein the pressure sensed during the previous cranking of the engine is a pressure averaged over a plurality of previous engine-cranking events.

6. The method of claim 1 wherein the pressure sensed during previous cranking of the engine is a pressure sensed during an engine-cranking event immediately prior to a current engine-cranking event.

7. The method of claim 1 further comprising illuminating a signal in a cabin of a vehicle if the excessive fuel viscosity is indicated.

8. The method of claim 1 further comprising heating a component of the fuel system responsive to the indication of the excessive fuel viscosity.

9. The method of claim 1 further comprising lengthening a fuel-injection pulse delivered to the engine responsive to the indication of the excessive fuel viscosity.

10. The method of claim 1 wherein the excessive fuel viscosity is indicated if the pressure sensed during the cranking of the engine is less than the pressure sensed during the previous engine cranking.

11. A vehicle system comprising:
   a diesel engine;
   a fuel system fluidically coupled to the engine via a fuel rail, the fuel system including a fuel-injection pump and a fuel filter;
   a temperature sensor;
   a fuel-pressure sensor disposed in the fuel system, wherein the fuel-pressure sensor is fluidically coupled to both the fuel rail and the fuel filter;
   an on-board diagnostic system; and
   a controller having code programmed into machine-readable storage media therein to crank the engine, and, if an output of the fuel-pressure sensor during the cranking of the engine is determined to differ by a threshold amount from an output of the fuel-pressure sensor during previous cranking of the engine, to indicate excessive fuel viscosity in the on-board diagnostic system only if a temperature sensed by the temperature sensor is determined to be below a threshold temperature, wherein indicating the excessive fuel viscosity includes setting a check-engine code indicative of the excessive fuel viscosity in the on-board diagnostic system, the check-engine code distinguishing the excessive fuel viscosity from other fuel-system issues including fuel-filter clogging or fuel-injector malfunction.

12. The vehicle system of claim 11 wherein the fuel-pressure sensor is one of a plurality of fuel-pressure sensors, wherein a first fuel-pressure sensor is arranged upstream of the fuel-injection pump and a second fuel-pressure sensor is arranged downstream of the fuel-injection pump, the controller further including code to heat a component of the fuel system responsive to the indication of the excessive fuel viscosity.

13. A method for diagnosing a performance issue in a vehicle system having a diesel engine, a fuel system, and an on-board diagnostic system, the method comprising:
   for a series of engine-cranking events, sensing a pressure in the fuel system and storing data indicative of the pressure sensed; and
   if the pressure sensed in the fuel system during engine cranking is determined to deviate from a trend in the data by a threshold amount, indicating excessive fuel viscosity in the on-board diagnostic system only if a temperature sensed by a temperature sensor is determined to be below a threshold temperature, wherein the trend is consistent with accumulation of fuel-borne impurities in a fuel filter of the fuel system, wherein indicating the excessive fuel viscosity includes setting a check-engine code indicative of the excessive fuel viscosity in the on-board diagnostic system, the check-engine code distinguishing the excessive fuel viscosity from other fuel-system issues including fuel-filter clogging or fuel-injector malfunction.

\* \* \* \* \*